United States Statutory Invention Registration [19]

[11] Reg. Number: H427

Hirate et al.

[43] Published: Feb. 2, 1988

[54] AIR/FUEL RATIO DETECTOR

[75] Inventors: Shintaro Hirate; Tetsusyo Yamada, both of Aichi, Japan

[73] Assignee: NGK Spark Plug Co., Ltd., Nagoya, Japan

[21] Appl. No.: 682,220

[22] Filed: Dec. 17, 1984

[30] Foreign Application Priority Data

Dec. 17, 1983 [JP] Japan ..... 58-238262
Dec. 17, 1983 [JP] Japan ..... 58-238263

[51] Int. Cl.[4] ..... G01N 27/26

[52] U.S. Cl. ..... 204/425; 204/426; 422/98

[58] Field of Search ..... 204/15, 421–429; 422/98

[56] References Cited

U.S. PATENT DOCUMENTS

| | | | |
|---|---|---|---|
| 3,791,936 | 2/1974 | Pebler et al. | 204/427 |
| 4,187,486 | 2/1980 | Takahasi et al. | 338/34 |
| 4,224,113 | 9/1980 | Kimura et al. | 204/1 T |
| 4,225,559 | 9/1980 | Achari et al. | 204/424 |
| 4,264,425 | 4/1981 | Kimura et al. | 204/412 |
| 4,298,573 | 11/1981 | Fujishiro | 204/412 |
| 4,304,652 | 12/1981 | Chiba et al. | 204/425 |
| 4,322,383 | 3/1982 | Yasuda et al. | 422/98 |
| 4,450,065 | 5/1984 | Yamada et al. | 204/412 |
| 4,498,968 | 2/1985 | Yamada et al. | 204/426 |
| 4,578,172 | 3/1986 | Yamada et al. | 204/412 |

*Primary Examiner*—John F. Terapane
*Assistant Examiner*—Susan Wolffe
*Attorney, Agent, or Firm*—Sughrue, Mion, Zinn, Macpeak & Seas

[57] ABSTRACT

An air/fuel ratio detector comprising a pump and an electrochemical cell in which both the pump and electrochemical cell comprise an oxygen ion conductive solid electrolyte sandwiched between porous electrodes. One of the elements has an insulating substrate formed on a portion of the electrolyte. Over the substrate is formed a layer of semiconducting metal oxide. The cell and pump face each other with the cell providing an EMF and the pump being pumped by a pump current. The size of the resistance of the metal oxide layer indicates whether the air/fuel mixture is rich or lean relative to a stoichiometric mixture and the values of the EMF and pump current indicate the deviation from stoichiometry.

10 Claims, 16 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR/FUEL RATIO DETECTOR

BACKGROUND OF THE INVENTION

1. Field of the Invention

The present invention relates to an air/fuel ratio detector for use in the measurement or control of the concentration of oxygen in exhaust gas from a combustion device such as an internal combustion engine or gas burner.

2. Description of the Prior Art

One type of oxygen sensor is capable of detecting combustion occurring at nearly a theoretically optimal or stoichiometric air/fuel ratio by sensing a change in electromotive force that is produced by the difference between the partial oxygen pressure of the exhaust gas and that of the atmospheric air. This type of oxygen sensor comprises an ion-conductive solid electrolyte (e.g., stabilized zirconia) coated with porous electrode layers (e.g., porous layers of Pt). This device is presently used in several applications, for example, in an automobile for the purpose of running its internal combustion engine at the theoretical air/fuel ratio.

The conventional oxygen sensor produces a great change in its output if the operating air/fuel ratio (A/F ratio, which is the weight ratio of air to fuel) is near the stoichiometric value of 14.7 but, otherwise, the resulting change in output is negligibly small. Therefore, the output from this sensor cannot be effectively used if the engine is operating at A/F ratios other than near the stoichiometric value.

Japanese Patent Application (OPI) No. 153155/1983 (the symbol OPI signifying an unexamined published Japanese patent application) shows an oxygen concentration detector comprising a pair of oxygen ion conductive and solid electrolyte plates each having an electrode layer on both sides in a selected area close to one end of the plates. The two plates are fixed parallel to each other and spaced to leave a gap in an area corresponding to that selected area having the electrode layers. One electrolyte plate with electrode layers is used as an oxygen pump element. The other plate, also having electrode layers, is used as an electrochemical cell element that operates by the difference in oxygen concentration between the ambient atmosphere and the gap between the two plates. This type of detector features quick response. However, according to experiments conducted by the present inventors, if this device is used in a fuel-rich region having a A/F ratio lower than the stoichiometric 14.7 value, the direction of change in the resulting output relative to the signal for the stoichiometric mixture is the same as that obtained in a fuel-lean region as shown in FIG. 8. Because of the existence of two A/F ratios for a single output, the sensor can be used only when it is definitely known whether the device to be controlled is operating in the fuel-rich or the fuel-lean region. Furthermore, the present inventors found it difficult to detect an A/F ratio at or near the stoichiometric value of 14.7, or accurately and responsively enable a feedback control over the A/F ratio by using this device.

SUMMARY OF THE INVENTION

Accordingly, one object of the present invention is to provide an air/fuel ratio detector that is capable of accurately and responsively detecting the operating A/F ratio of a combustion burner such as an internal combustion engine whether it is operating in the fuel-rich region, fuel-lean region, at the stoichiometric A/F ratio point, or in the entire region or a part thereof.

Another object of the present invention is to provide an air/fuel ratio detector that enables a precise and simple feedback control over the above-mentioned A/F ratio regions.

An air/fuel ratio detector according to one embodiment of the present invention is summarized as comprising a solid electrolyte and electrochemical cell element sensitive to a difference in oxygen concentration and a solid electrolyte oxygen pump element, each element being in the form of an oxygen ion conductive solid electrolyte having porous electrodes formed on both sides. At least one of the elements has an electrically insulating substrate formed on one side except for the area where the porous electrode is provided. The insulating substrate is formed on either the electrochemical cell or the pump or possibly on both. The substrate has a metal oxide semiconductor layer formed on its surface. The electrochemical cell and the pump are disposed to face each other a small distance apart. The air/fuel ratio is detected both by a change in electrical properties of the metal oxide semiconductor layer and by an output signal provided by either the electromotive force of the electrochemical cell or by the pump current flowing through the pump.

An air-fuel ratio detector according to another embodiment of the present invention comprises a solid electrolyte, an electrochemical cell element sensitive to a difference in the concentration of oxygen, a solid electrolyte oxygen pump element and an oxygen reference element having a metal oxide semiconductor layer formed on the surface of an electrically insulating member. The electrochemical cell and the pump are disposed to face each other a small distance apart. The air/fuel ratio is detected both by a change in electrical properties in the metal oxide semiconductor layer and by an output signal provided by either the electromotive force of the electrochemical cell element or by the pump current flowing through the pump.

Because of the arrangements described above, the detector of the present invention has the advantage of requiring only one sensor probe for achieving the detection of the accurate value of the A/F ratio over the entire operating range including both the fuel-rich and fuel-lean regions.

PREFERRED EMBODIMENTS OF THE INVENTION

Figure 1:
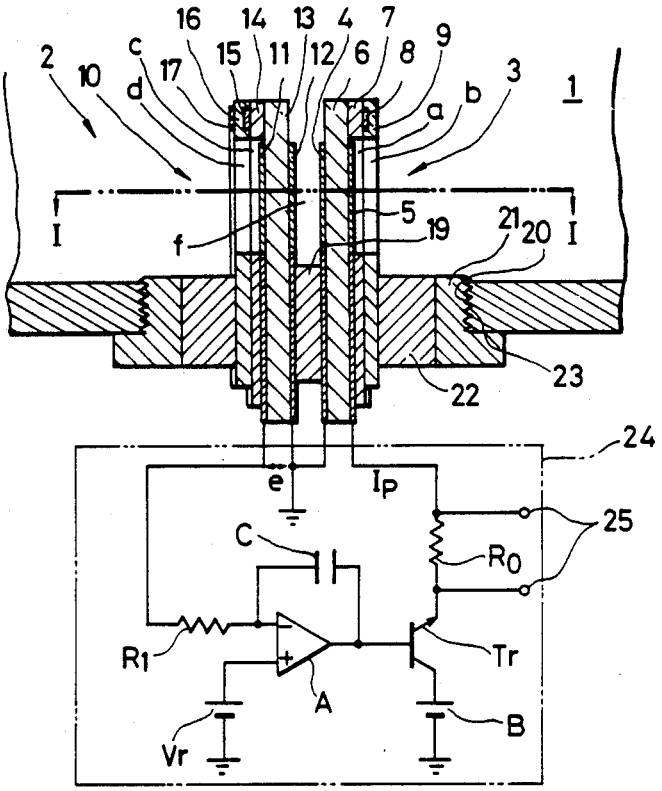
FIG. 1 is an illustration of the air/fuel ratio detector, both its probe and its circuitry according to one embodiment of the present invention.
Figure 2:
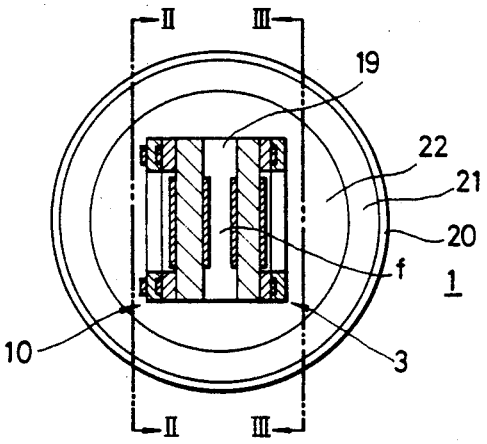
FIG. 2 is a cross section taken along the line I—I of FIG. 1.
Figure 3:
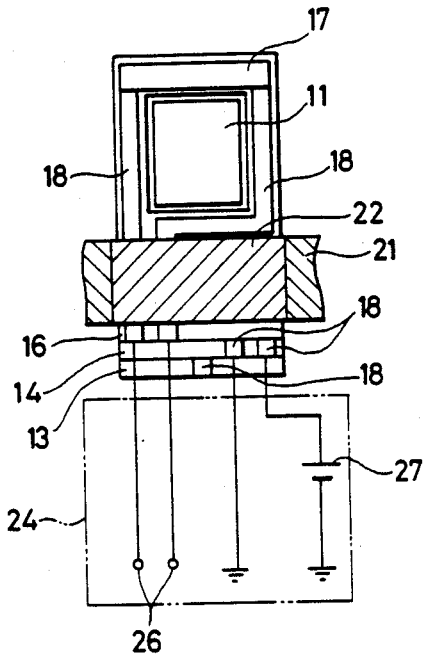
FIG. 3 is a cross section taken along the line II—II of FIG. 2.
Figure 4:
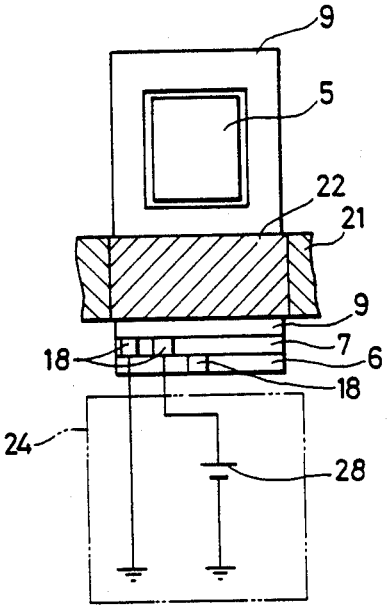
FIG. 4 is a cross section taken along the line III—III of FIG. 2.

The A/F ratio detector according to one embodiment of the present invention will now be described with reference to FIGS. 1 to 6. The detector has a probe section 2 which is mounted in, for example, an exhaust pipe 1 from an internal combustion engine. The probe 2 includes a solid electrolyte oxygen pump element 3 and a solid electrolyte, electrochemical cell element 10 for sensing the difference in the concentration of oxygen.

The pump 3 consists of an ion conductive, solid electrolyte plate 6 about 0.5 mm thick and preferably made of stabilized zirconia. Porous platinum electrode layers 4 and 5 are formed on opposite sides of the plate 6 by a thick-film deposition technique to a thickness of about 20 μm. A highly heat-conductive but electrically insulating substrate 7, which may be a thin sheet or a printed film, is located on one side of the solid electrolyte plate 6, for instance on the side of the porous Pt layer 5. This substrate has a window a complying with the contour of the Pt layer 5 so that the latter is exposed through the window a. The substrate 7 is in a tabular form having a thickness of about 0.25 mm and being made of a highly heat conductive and electrically insulating material such as alumina or spinel. An electric heater 8 is formed around the window a on the heat-conductive and electrically insulating substrate 7 on its side opposite the side in contact with the solid electrolyte plate 6. The heater 8 is spaced apart both from the periphery of the window a and from the outer edges of the substrate 7. A tabular highly heatconductive and electrically insulating substrate 9 isolates the heater 8 from the outside by enclosing it against substrate 7. The substrate 9 has a corresponding window b which, like the window a, complies with the contour of the Pt layer 5 so that the latter is exposed through the windows a and b.

The electrochemical cell 10 consists of an ion conductive, solid electrolyte plate 13 (about 0.5 mm thick and preferably made of stabilized zirconia) that has porous platinum electrode layers 11 and 12 formed to a thickness of about 20 μm on opposite sides of the electrolyte plate 13. These layers 11 and 12 are formed by a thick-film deposition technique. The electrochemical cell 10 further includes a tabular highly heat-conductive but electrically insulating substrate 14 which is disposed on one side of the solid electrolyte plate 13. For instance, the substrate 14 may be located on the side where the porous Pt layer 11 is located. The substrate 14 also has a window c complying with the contour of the Pt layer 11 so that the latter is exposed through the window. An electric heater 15 is formed around the window c (see FIG. 5) on the side of the highly heat-conductive, electrically insulating substrate 14 opposite the side in contact with the solid electrolyte plate 13, with the heater 15 being spaced away both from the periphery of the window c and from the outer edges of the substrate 14. A tabular, highly heat-conductive but electrically insulating substrate 16 isolates the heater 15 from the outside by covering it over the substrate 14. The substrate 16 likewise has a window d which, like the window c, complies with the contour of the Pt layer 11 so that the latter is exposed through windows c and d. A semiconducting metal oxide layer 17, such as a titania element, is located around the window d on that side of the substrate 16 opposite the heater 15 and is formed to a thickness of about 50 μm by a thick-film deposition technique. The electrical elements of the electrodes 4 and 5 and the heater 8 located on the pump element 3 and of the electrodes 11 and 12, the heater 15, and the metal oxide 17 located on the electrochemical cell element 10 have respective external leads 18 which are formed by a thick-film deposition technique.

The pump element 3 and the electrochemical cell element 10 are erected side by side in the exhaust pipe 1 so that the Pt electrode layer 4 and the Pt layer 12 form a gap f which is as small as about 0.05 to 0.1 mm. The two elements 3 and 10 are fixed together by filling the gap at the base portion with a heat-resistive and insulating spacer 19. An adhesive filler may be used as the spacer. A support 21 with a male thread 20 is fixed around the base portion of the combined pump 3 and electrochemical cell 10 by means of a heat-resistive and insulating adhesive member 22. The probe 2 is securely mounted in the exhaust pipe 1 by engaging the male thread 20 to a corresponding female thread 23 in the exhaust pipe 1.

Figure 6:
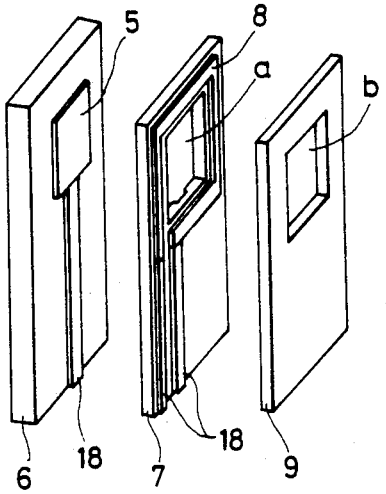
FIG. 6 is an exploded perspective view of an oxygen pump.

The fuel ratio detector probe 2 having the construction shown above may most advantageously be fabricated by the following procedure. As shown in FIG. 6 for the pump 3, an ion conductive solid electrolyte plate 6, for example, a green sheet of solid electrolyte zirconia, is patterned on both sides with a predetermined pattern of porous platinum electrode layers 4 and 5 and associated leads 18. The pattern is printed by a thick-film deposition technique. An electric heater made of a platinum resistor 8 and associated leads 18 is sandwiched between two highly heat-conductive and electrically insulating substrates 7 and 9, for example, two tabular green spinel sheets each having a window a or b. The sheets 7 and 9 are pressed onto one side of the previously prepared green zirconia sheet 6, and the assembly is sintered to form an oxygen pump 3 of the ceramic clad type.

Figure 5:
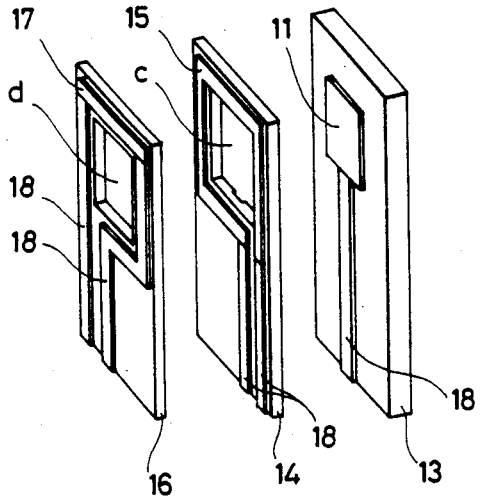
FIG. 5 is an exploded perspective view of an electrochemical cell for detecting a difference in the concentration of oxygen.

The electrochemical cell 10 is fabricated as shown in FIG. 5. An ion conductive solid electrolyte plate 13 is patterned on both sides with a predetermined pattern of porous platinum electrode layers 11 and 12 and associated leads 18. A highly heat-conductive and electrically insulating substrate 14 has an electric heater 15 and associated leads 18 formed on one side. Another highly heat-conductive and electrically insulating substrate 16 is additionally patterned with predetermined pattern of leads 18 for the metal oxide semiconductor 17. These three elements of electrolyte plate 13 and substrates 14 and 16 are pressed together and sintered to form the electrochemical cell 10 for sensing the difference in oxygen concentration. The thus obtained electrochemical cell is patterned with a predetermined pattern of metal oxide in the manner that the end portions of the leads 18 are bridged by said pattern and subsequently is baked in the sintering atmosphere to form a thick film of the metal oxide semiconductor 17 (e.g., titania). The pump 3 and the electrochemical cell 10 are placed side by side with a thickness gauge inserted therebetween. The pump 3 and the cell 10 are fixed together by filling the gap at the base portion with a spacer or heatresistive ceramic adhesive agent 19.

An example of the electronic control unit 24 for use with the detector of the present invention is shown in FIG. 1. The electromotive force e generated between the porous Pt electrode layers 11 and 12 on the electrochemical cell 10 is applied to the inverting input terminal of an operational amplifier A through a resistor $R_1$. The amplifier A produces an output proportional to the difference between the voltage e and a reference voltage $V_r$ applied to the noninverting input terminal of the amplifier A. The output of the amplifier A drives a transistor Tr to control the pump current $I_p$ flowing between the Pt electrode layers 4 and 5 on the pump 3. The pump current $I_p$ must be sufficiently large to maintain a constant electromotive force e at the level $V_r$. The control unit 24 also includes a resistor $R_o$ on the lead 18 to the Pt electrode layer 5 from a d.c. source B. The output of the amplifier A and its inverting input are connected by a capacitor C. The control unit 24 also has a set of output terminals 26 (FIG. 3) connected to the two leads 18 of different ends of the metal oxide layer 17 for picking up a signal indicative of a change in the electrical resistance of the metal oxide layer 17. Terminals 25 on either side of the resistor $R_o$ then provide a signal corresponding to the pump current $I_p$ to the Pt electrode 5. The electric heater 8 for heating the porous Pt electrode layers 4 and 5 is connected to a power source 28, shown in FIG. 4. The heater 15 for heating the semiconducting metal oxide layer 17 and porou Pt electrode layers 11 and 12 is connected to another power source 27, shown in FIG. 3.

Figure 7:
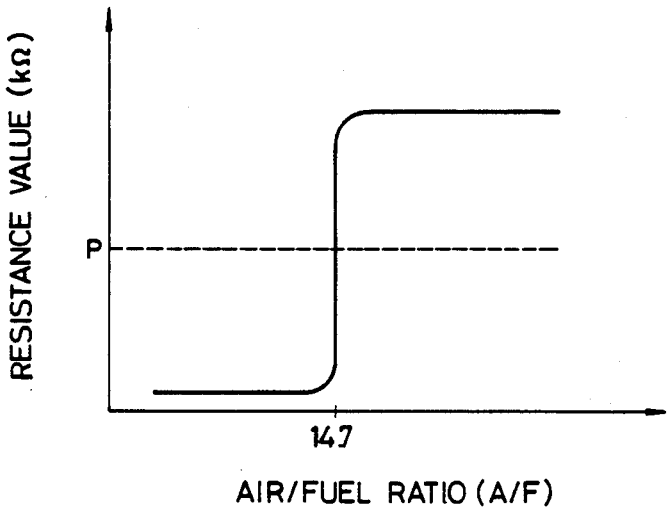
FIG. 7 is a characteristic curve showing the profile of A/F ratio vs. the electrical resistance of a semiconducting metal oxide.
Figure 8:
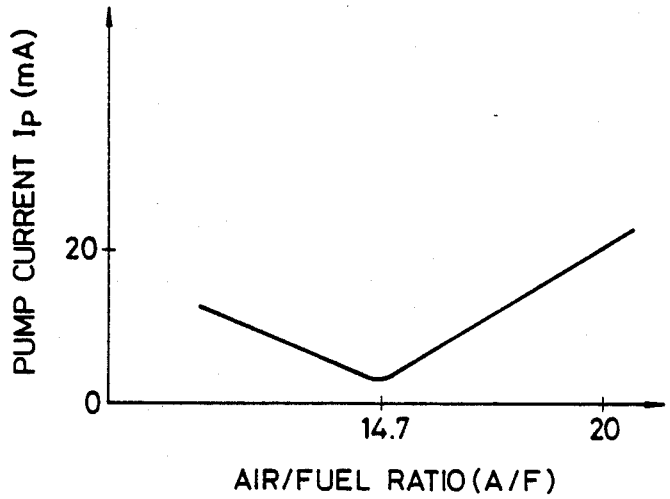
FIG. 8 is a characteristic curve showing the profile of A/F ratio vs. pump-out current $I_p$ flowing through the pump, with the electromotive force of the electrochemical cell being held constant.

Two characteristic curves for the detector shown in FIGS. 1 to 6 are illustrated in FIGS. 7 and 8. FIG. 7 shows the functional dependence upon the A/F ratio for the electrical resistance of the semiconducting metal oxide layer 17 as measured at the output terminals 26. The resistance is low in the fuel-rich region where the A/F ratio is smaller than the stoichiometric value of 14.7; at about 14.7, there occurs a sudden increase in the resistance, and in the fuel-lean region (A/F greater than 14.7), the resistance assumes a large value.

FIG. 8 shows the profile of A/F ratio vs. $I_p$ for a reference voltage $V_r$, which is kept constant, say, at 20 mV. When the electromotive force e is at 20 mV, $I_p$ flowing in the pump-out direction decreases with the increasing of the A/F ratio in the fuel-rich region (A/F less than 14.7), and $I_p$ increases in proportion to the A/F ratio in the fuel-lean region (A/F greater than 14.7), in order to maintain the electromotive force e at 20 mV.

The detector according to the embodiment shown in FIGS. 1 to 6 makes use of the characteristics depicted in FIGS. 7 and 8. The output terminals 26 for detecting a change in the electrical resistance of the semiconducting metal oxide 17 are so designed that the detector will sense both the fuel-rich region ($R<P$) and the fuel-lean region ($R>P$), where P is a reference resistance set between the fuel-rich and fuel-lean asymptotic values. When the engine is running in the fuel-rich region, the resistance of the semiconductor layer 17 is smaller than the reference resistance P and this binary information and an output signal corresponding to the resultant pump current $I_p$ flowing through the pump 3 may be combined so as to achieve a precise measurement or fine control of the A/F ratio for the fuel-rich region. If the engine is operating in the fuel-lean region, the resistance of the semiconductor layer 17 is greater than the reference resistance P. This binary information and an output signal corresponding to the resultant pump current $I_p$ may be combined to obtain a precise measurement or control of the A/F ratio for the fuel-lean region. If the engine is to be operated near the stoichiometric A/F ratio of 14.7, the resistance of the semiconducting metal oxide 17 drops suddenly as the decreasing A/F ratio approaches the stoichiometric value of 14.7. This resistance change may be used directly or indirectly as a feedback control signal. The resistance value alone can be detected at the output terminal 26.

With the construction shown above, the detector of the present invention enables an accurate measurement of the A/F ratio of an engine over a wide range including both the fuel-rich and fuel-lean regions as well as the nearly stoichiometric region. One application of this detector is a feedback control of the A/F ratio wherein the present level of A/F ratio is detected by the probe 2 mounted in the exhaust pipe 1 and is passed through a feedback loop to correct the A/F ratio so as to maintain the desired A/F ratio level.

The proportional change of $I_p$ with the A/F ratio in the fuel-lean region is already known and shown in, for example, Japanese Patent Application (OPI) No. 153155/1983. The partial pressure of oxygen in the exhaust gas introduced into the gas f is modified by the action of the pump element 3 to a value which differs from the partial pressure of the oxygen in the exhaust gas flowing through the pipe 1. The pump-out current $I_p$ supplied to the pump element 3 is controlled so that the electromotive force e of the electrochemical cell 10, as produced in response to the differential partial oxygen pressure, is maintained constant. As a consequence of this control, it has been found that the pump current $I_p$ changes in proportion to the concentration of oxygen in the exhaust gas. Sensitivity to CO gas would be the primary reason for this oxygen pump-out mechanism which occurs in the fuel-rich region.

Figure 9:
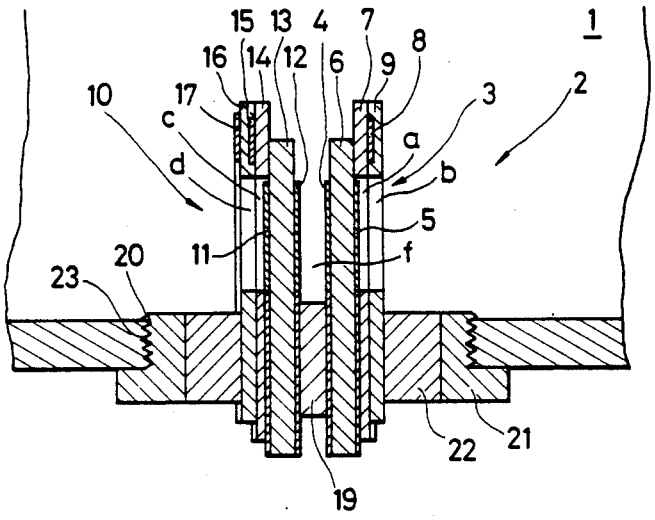
FIG. 9 is an illustration of the probe of the detector according to another embodiment.

FIG. 9 shows the detector probe 2 according to another embodiment of the present invention. In this embodiment, highly heat-conductive and electrically insulating substrates 7 and 9 enclosing the electric heater 8 and substrates 14 and 16 enclosing the electric heater 15 project from the top sides of the ion conductive, solid electrolyte plates 6 and 13. The increased area of each substrate 7, 9, 14 and 16 permits easy mounting of the heaters 8 and 15, the semiconducting metal oxide layer 17 and associated leads 18 on the substrates.

In the previous embodiments described above, a heater is buried in the highly heat-conductive and electrically insulating substrate that is formed on either surface of the oxygen pump element 3 or of the electrochemical cell element 10. The substrate serves as a support for a semiconducting metal oxide layer. The heater may be omitted if the gas to be analyzed is sufficiently hot to activate the pump 3, the electrochemical cell 10 and the semiconducting metal oxide layer 17 without the need of separate heating.

The A/F ratio detector according to a third embodiment of the present invention is shown in FIGS. 10 to 15. The major difference between FIG. 10 and FIG. 1 concerns the position in which the semiconducting metal oxide layer 17 is mounted. The components which are common to the embodiment of FIGS. 1 to 6 and that of FIGS. 10 to 15 are identified by like numerals. The layout shown in FIG. 10 includes an oxygen reference element 117 as an additional component of the detector probe 2. As shown, this element consists of a highly heat-conductive and electrically insulating plate 16a (typically made of alumina and having a thickness of about 1 mm) which has an opening da that permits free passage of the exhaust gas. A semiconducting metal oxide layer 17 (e.g., a titania element) is formed to a thickness of about 50 μm by a thick-film deposition technique on one side of the plate 16 above the opening da. The electrodes 4 and 5 and the heater 8 mounted on the pump 3, the electrodes 11 and 12 and the heater 15 on the electrochemical cell 10, and the metal oxide layer 17 on the oxygen reference element 117 all have respective external leads 18 which are formed by a thick-film deposition technique.

The reference element 117 may be mounted in the exhaust pipe 1 by fixing it to the electrochemical cell 10 with a heat resistive spacer 122 that is inserted between the reference element 117 and the cell 10 to provide a gap h. The gap h need not be so small as the gap f. The electrochemical cell 10 is bonded to the pump 3 by spacer 19. A support 21 with a male thread 20 is fixed around the base portion of the combined structure of the pump 3, cell 10 and oxygen reference element 117 by means of a heat-resistive and insulating adhesive member 22. The probe 2 is securely mounted in the exhaust pipe 1 by engaging the male thread 20 with a female thread 23 in the exhaust pipe 1.

Figure 10:
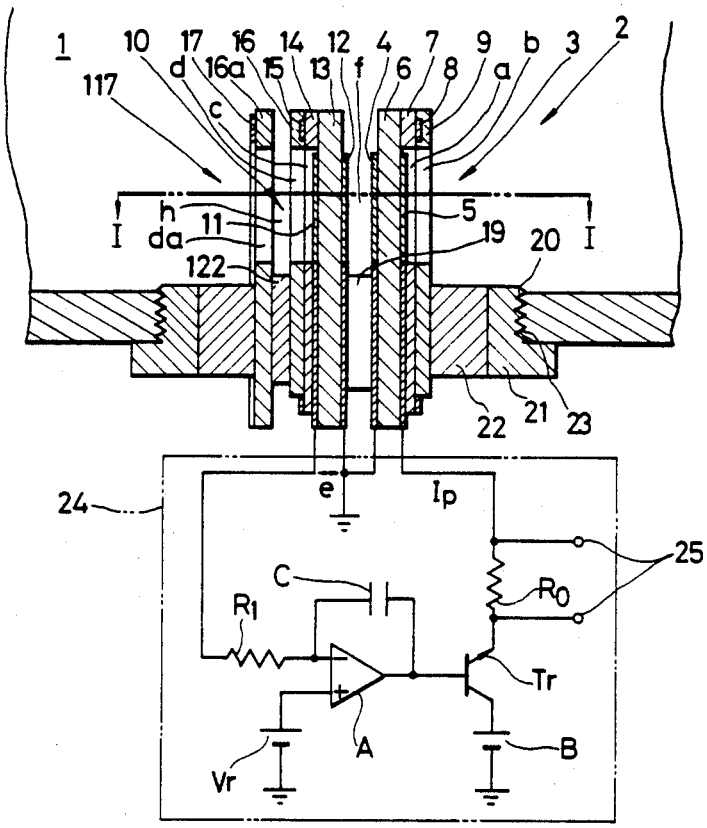
FIG. 10 is an illustration of the detector according to still another embodiment of the present invention.
Figure 11:
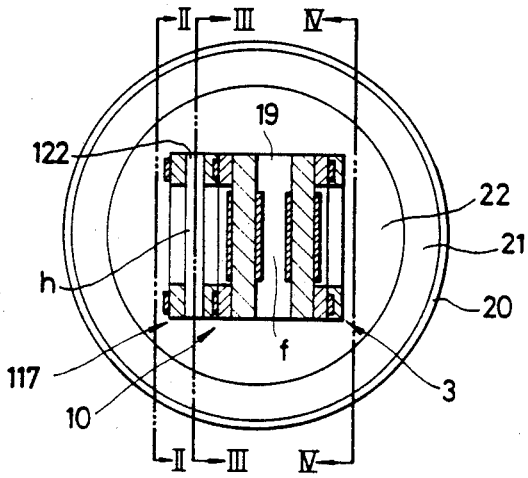
FIG. 11 is a cross section taken along the line I—I of FIG. 10.
Figure 12:
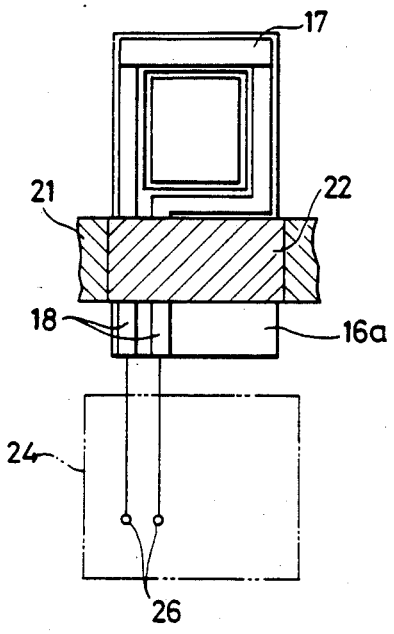
FIG. 12 is a cross section taken along the line II—II of FIG. 11.

The A/F ratio detector probe 2 having the structure shown in FIG. 10 may most advantageously be fabricated by a procedure which is similar to that used to fabricate the detector shown in FIG. 6. More specifically, the process is shown in FIG. 6 for the pump 3 (electrochemical cell 15, the components for the electrochemical cell 10 being referenced in parentheses). An ion conductive, solid electrolyte plate 6(13), for example, a green sheet of solid electrolyte zirconia, is patterned on both sides with a predetermined pattern of porous platinum electrode layers 4 and 5 (11 and 12) and associated leads 18. The pattern is printed by a thick-film depositing technique. An electric heater 8(15) made of a platinum resistor and associated leads 18 are sandwiched between two highly heat-conductive and electrically insulating substrates 7 and 9 (14 and 16). For example, two tabular green spinel sheets each having a window a or b (c or d) are pressed onto one side of the previously prepared green zirconia sheet 6(13). The assembly is sintered to form an oxygen pump 3 (electrochemical cell 10) of the ceramic clad type. Then, a highly heat-conductive and electrically insulating plate 16a made of, for example, ceramic alumina with the opening da, is patterned on one side with a predetermined pattern of leads 18 for the semiconducting metal oxide layer 17. Then, the plate 16a is sintered to form a sintered substrate of an oxygen reference element 117. A thick film of the semiconducting metal oxide (e.g., titania) is printed by a thick-film deposition technique nique and then baked in the sintering atmosphere to form an oxygen reference element 117. The pump 3, electrochemical cell 10 and the reference element 117 are placed side-by-side with a thickness gauge inserted between the pump 3 and the cell 10 to form the small gap f and another thickness gauge is inserted between the cell 10 and the reference element 117 to form the gap h. The three elements are fixed together by filling the respective gaps at the base portion with spacers or heat-resistive ceramic adhesive agents 19 and 122.

Figure 13:
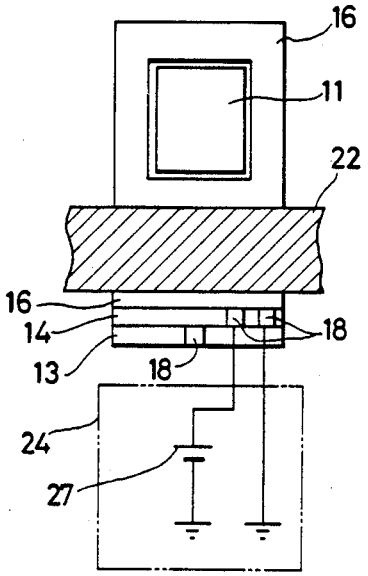
FIG. 13 is a cross section taken along the line III—III of FIG. 11.
Figure 14:
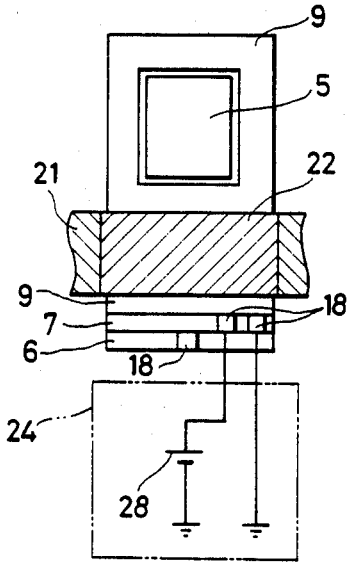
FIG. 14 is a cross section taken along the line IV—IV of FIG. 11.
Figure 15:
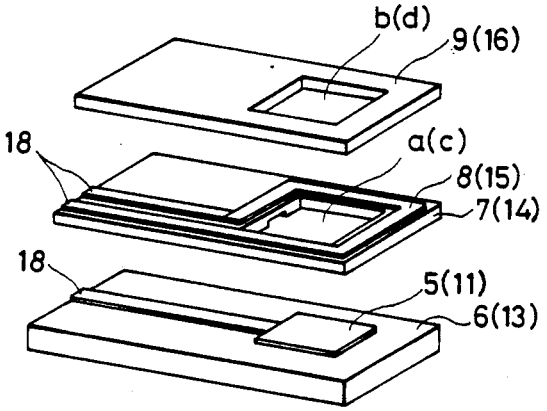
FIG. 15 is an exploded view of the oxygen pump and the electrochemical cell for sensing the difference in oxygen concentration.

An example of the electronic control unit 24 for use with the detector according to the third embodiment of FIG. 10 is also shown in FIG. 10. This control unit 24 is essentially the same as the control unit 24 in FIG. 1. The control unit 24 has output terminals 26 similar to those of FIG. 3 for picking up a signal indicative of a change in the electrical resistance of the semiconducting metal oxide layer 17 in the oxygen reference element 117. The electrical resistance of the semiconducting metal oxide 17 is used as a criterion for determining whether the engine is operating in the fuel-rich or fuel-lean region. The electric heater 8 for heating the porous Pt electrode layers 4 and 5 is connected to a power source 28, shown in FIG. 14. The heater 15 for heating the metal oxide layer 17 and the porous Pt electrode layers 11 and 12 is connected to another power source 27, as shown in FIG. 13.

The detector shown in FIGS. 10 to 15 has characteristics which are essentially the same as those illustrated in FIGS. 7 and 8.

In the embodiment of FIG. 10, the two heaters are integral with the pump 3 and the electrochemical cell 10, respectively. If desired, a heater may be embedded in a tabular highly heat-conductive and electrically insulating substrate which does not necessarily have any opening and provides a support for the oxygen reference element. This tabular substrate is place in a side-by-side relation with the pump 3 and electrochemical cell 10. The embedded heater will heat not only the metal oxide of the oxygen reference element but also an adjacent element (preferably the pump element). The heater may even be omitted if the gas to be analyzed is sufficiently hot to activate the pump 3, the cell element 10 and the oxygen reference element 117 without separate heating.

Figure 16:
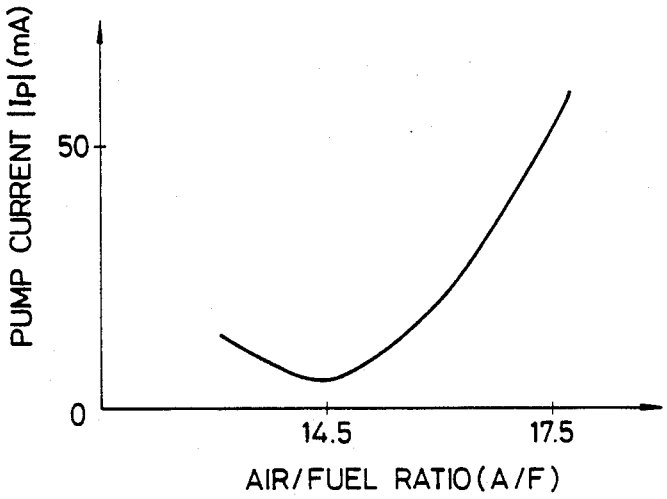
FIG. 16 is a characteristic curve showing the relation of the A/F ratio vs. pump-in current $I_p$ flowing through the pump, with the EMF of the electrochemical cell being held constant.

In the foregoing embodiments, the pump current $I_p$ flowing through the pump element 3 has such a direction that oxygen is pumped out of the small gap f ($I_p>0$). If desired, $I_p$ may be caused to flow in opposite direction ($I_p<0$) so that oxygen is pumped into the small gap f from the exhaust gas in the pipe 1. FIG. 16 shows the dependence of the A/F ratio upon $I_p$ in this modified case, with the output of the electrochemical cell element 10 being held constant. The characteristics shown in FIG. 16 may also be used for the purposes of the present invention since they reflect a certain correlation between the operating A/F ratio and the pump current $I_p$.

When the pump current $I_p$ flowing through the pump 3 (whether oxygen is pumped into or out of the small gap f) is held constant, then the electromotive force e generated by the electrochemical cell 10 also varies with the A/F ratio. This correlation may be used for achieving the purposes of the present invention.

In the detection probe of the present invention, the pump element and the sensor element are provided side by side in the exhaust pipe with a small gap therebetween. As preferable embodiments they are fixed together by filling the gap at the base portions with a spacer. Thus, the gap formed between the pump element and the sensor element is preferable in order to sufficiently open the peripheral edges to the exhaust gases so as to increase its response. However, the present invention is not limited to the configuration of open edges except for the base portions. For example, it is possible to provide a few support members between the solid-electrolyte plates of the pump element and the sensor element for more readily regulating the gap dimensions as far as the support member does not cause any considerable reduction of responsivity. Also, the gap between the pump element and the sensor element is preferably in a range from 0.01 to 0.15 mm. If the gap is too narrow, the responsivity is reduced.

Of the electrode layers of the respective element, an electrode layer for defining a small or fine gap is preferably a porous thick layer having a mean porosity of about 10–40% as determined by a porosimeter of pressurized mercury type in consideration of its diffusion resistance againt the associated component gases such as oxygen gas.

Furthermore, in the case that the electrode layer is formed by a suitable thin-film deposition technique, it is preferable to, thereon, provide a porous layer such as a ceramic material to which may be added with a catalytic agent for obtaining a catalytic action.

Thus, a highly-responsive detection probe can be readily manufactured by the above described conditions.

The characteristics shown above that are provided by the detector probe 2 of the present invention may be used either individually or in combination for the purpose of effecting a continuous feedback control over the operating air/fuel ratio throughout the operating range by frequently changing the characteristics to be used.

What is claimed is:

1. An air/fuel ratio detector comprising a solid electrolyte electrochemical cell element actuated by an oxygen concentration difference and a solid electrolyte oxygen pump element, each element being in the form of an oxygen ion conductive solid electrolyte having a porous electrode formed on both sides, and further comprising a semiconducting metal oxide layer, said cell element and said pump element and said metal oxide layer being disposed a small distance part, said electrochemical cell and said pump element providing a first electrical signal varying with the air/fuel ratio over a first range, said metal oxide providing a second electrical signal varying, more sharply than said first electrical signal, with the air/fuel ratio over a second range included within and narrower than said first range.

2. An air/fuel ratio detector comprising a solid electrolyte electrochemical cell element actuated by an oxygen concentration difference and a solid electrolyte oxygen pump element, each element being in the form of an oxygen ion conductive solid electrolyte having a porous electrode formed on both sides, at least one of said elements having an electrically insulating substrate formed on one side except for the area where said porous electrode is provided, said insulating substrate having a semiconducting metal oxide layer formed on its surface, said cell element and said pump element being disposed to face each other a small distance apart, said electrochemical cell and said pump element providing a first electrical signal varying with the air/fuel ratio over a first range, said semiconducting metal oxide layer providing a second electrical signal varying, more sharply than said first electrical signal, with the air/fuel ratio over a second range included within and narrower than said first range.

3. A detector as recited in claim 2, wherein said first electrical signal is derived from a pump current of said pump element and further comprising means for holding an electromotive force of said cell element substantially constant.

4. An air/fuel ratio detector comprising a solid electrolyte electrochemical cell element actuated by an oxygen concentration difference, a solid electrolyte oxygen pump element, and an oxygen reference element having a semiconducting metal oxide layer formed on the surface of an electrically insulating member, said cell element and said pump element being disposed to face each other a small distance apart, said electrochemical cell and said pump element providing a first electrical signal varying with the air/fuel ratio over a first range, said semiconducting metal oxide layer providing a second electrical signal varying, more sharply than said first electrical signal, with the air/fuel ratio over a second range included within and narrower than said first range.

5. A detector as recited in claim 4, wherein said first electrical signal is derived from a pump current flowing through said element and further comprising means for holding an electromotive force of said cell element substantially constant.

6. A method for measuring air/fuel ratio, comprising the steps of:

placing within a chamber containing an air/fuel mixture to be measured a solid electrolyte electrochemical cell element actuated by an oxygen concentration difference and a solid electrolyte pump element, each element being in the form of an oxygen ion conductive solid electrolyte having a porous electrode formed on each side;

placing within said chamber a semiconducting metal oxide layer, said metal oxide, said cell element and said pump element being disposed a small distance apart;

measuring an output signal derived from an electromotive force of said cell element and from a pump current flowing through said pump element, thereby measuring a deviation from a stoichiometric point of said mixture; and measuring a change in electrical properties of said metal oxide, thereby measuring the direction of said deviation from said stoichiometric point.

7. A method as recited in claim 6, further comprising holding said electromotive force substantially constant and wherein said step of measuring an output signal comprises measuring said pump current.

8. A method as recited in claim 6, further comprising the step of holding said pump current substantially constant and wherein said step of measuring an output signal comprises measuring said electromotive force.

9. A method as recited in claim 6, further comprising the step of resistively heating said cell element and said pump element.

10. A method as recited in claim 9, further comprising the step of resistively heating said semiconducting metal oxide layer.

* * * * *